O. THIEME.
CALCULATING MACHINE.
APPLICATION FILED MAY 18, 1917.

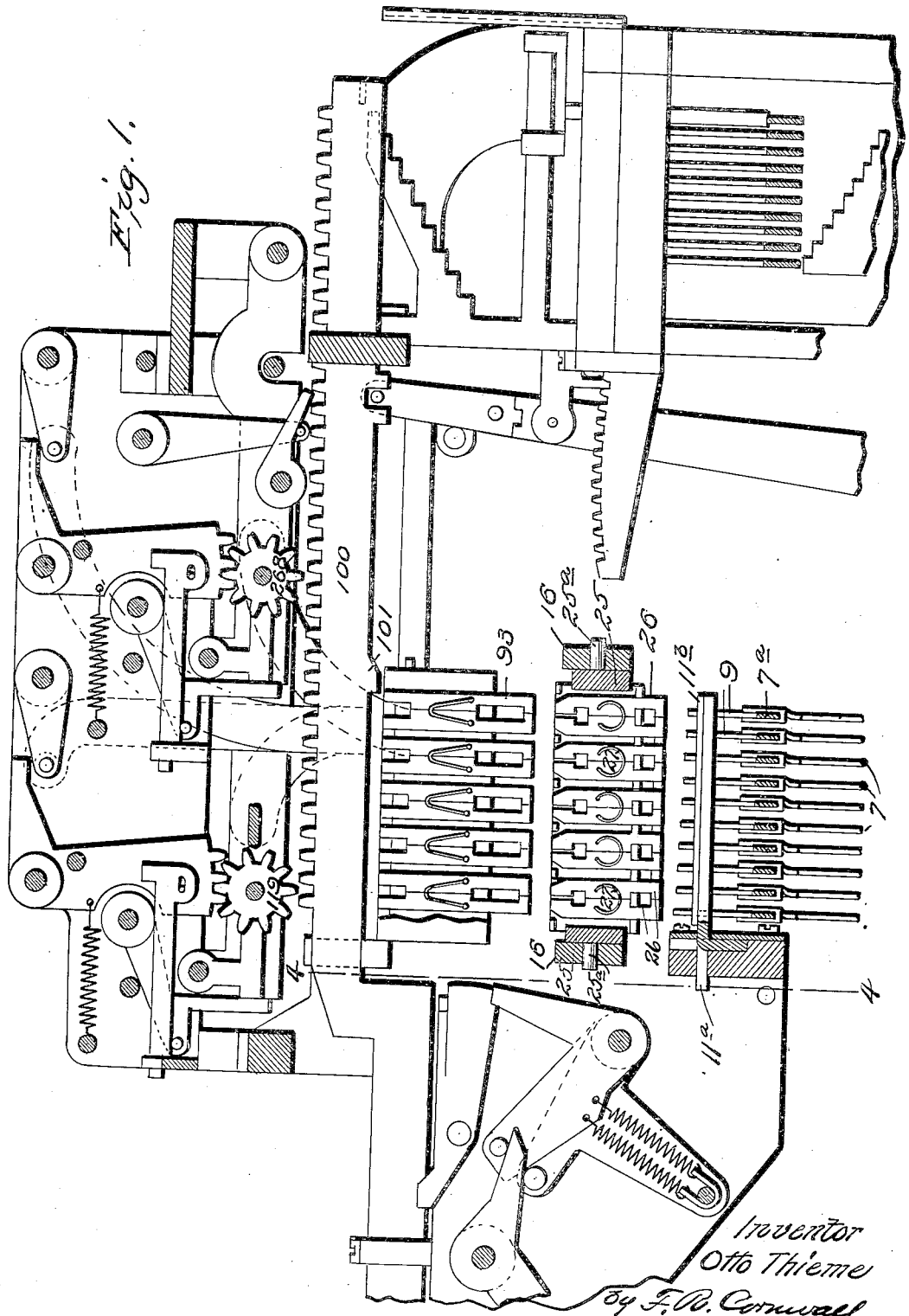

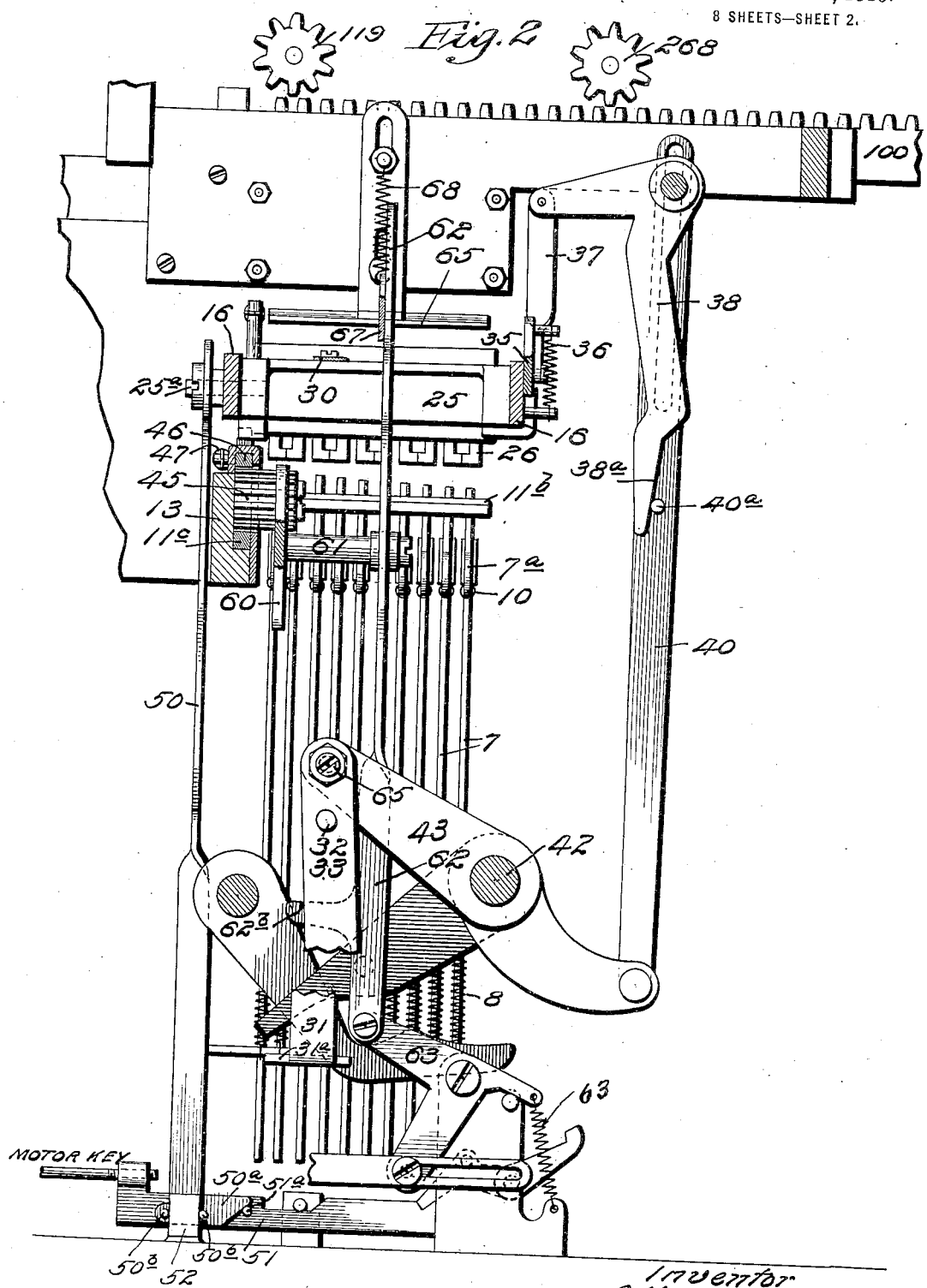

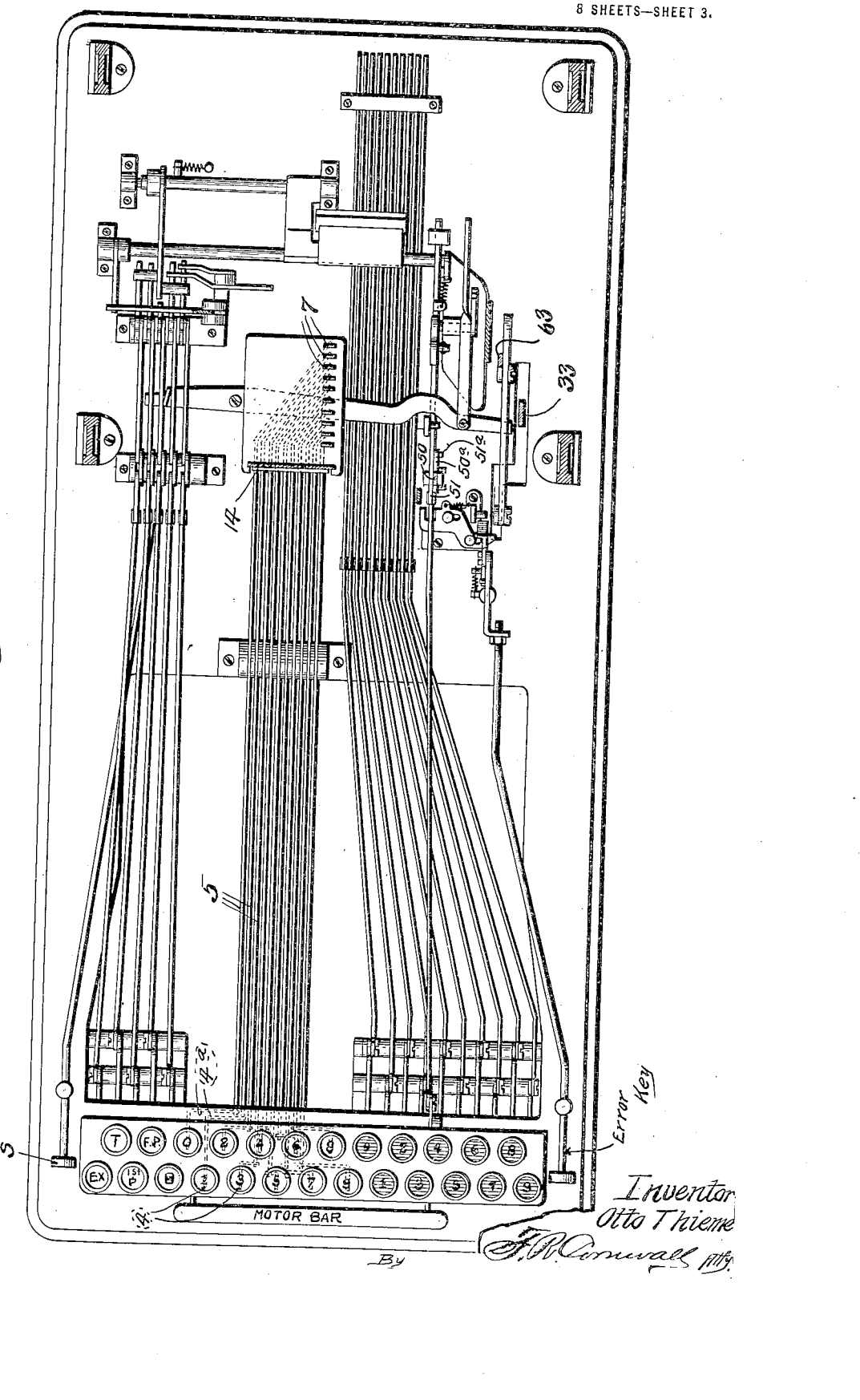

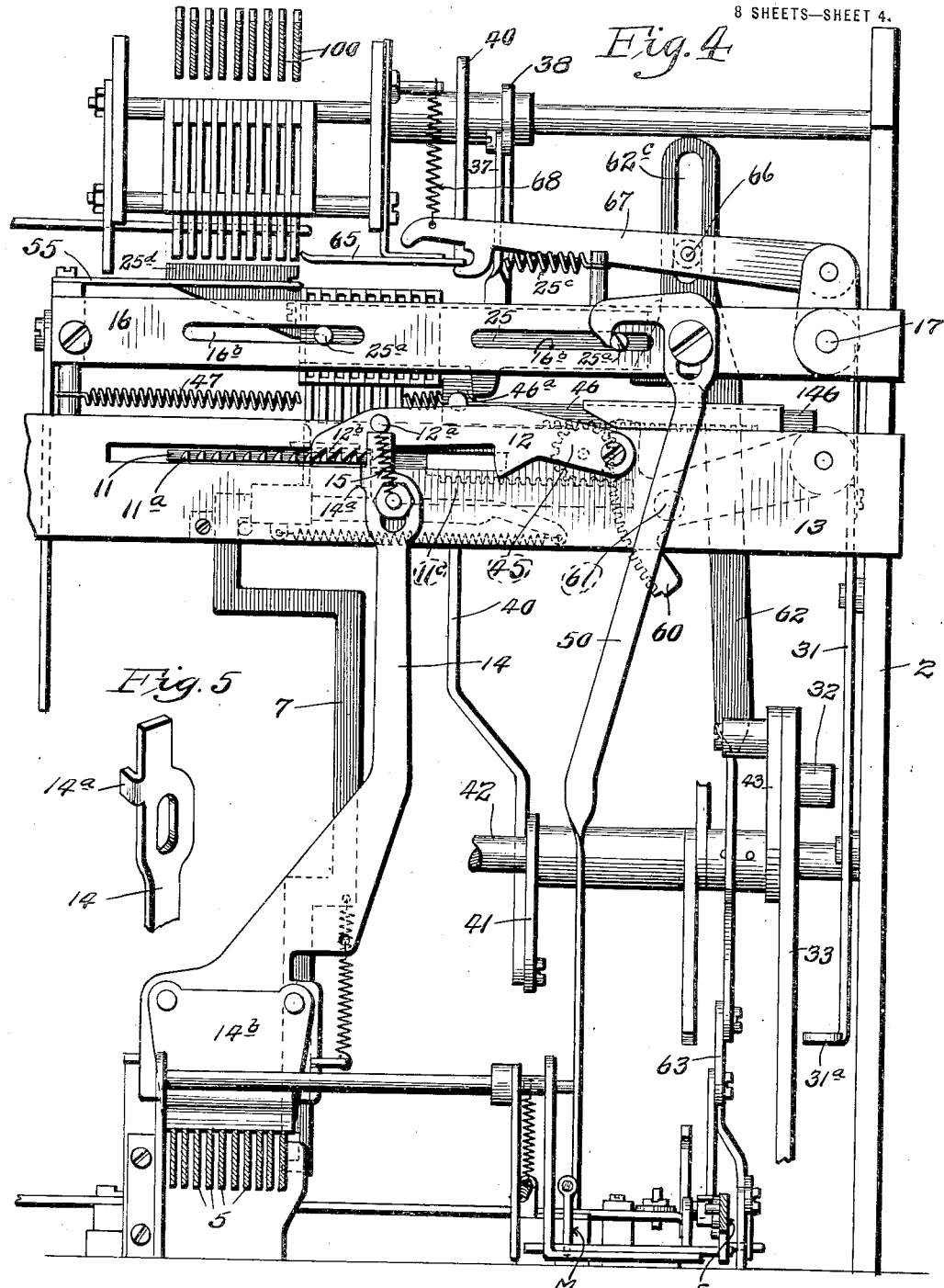

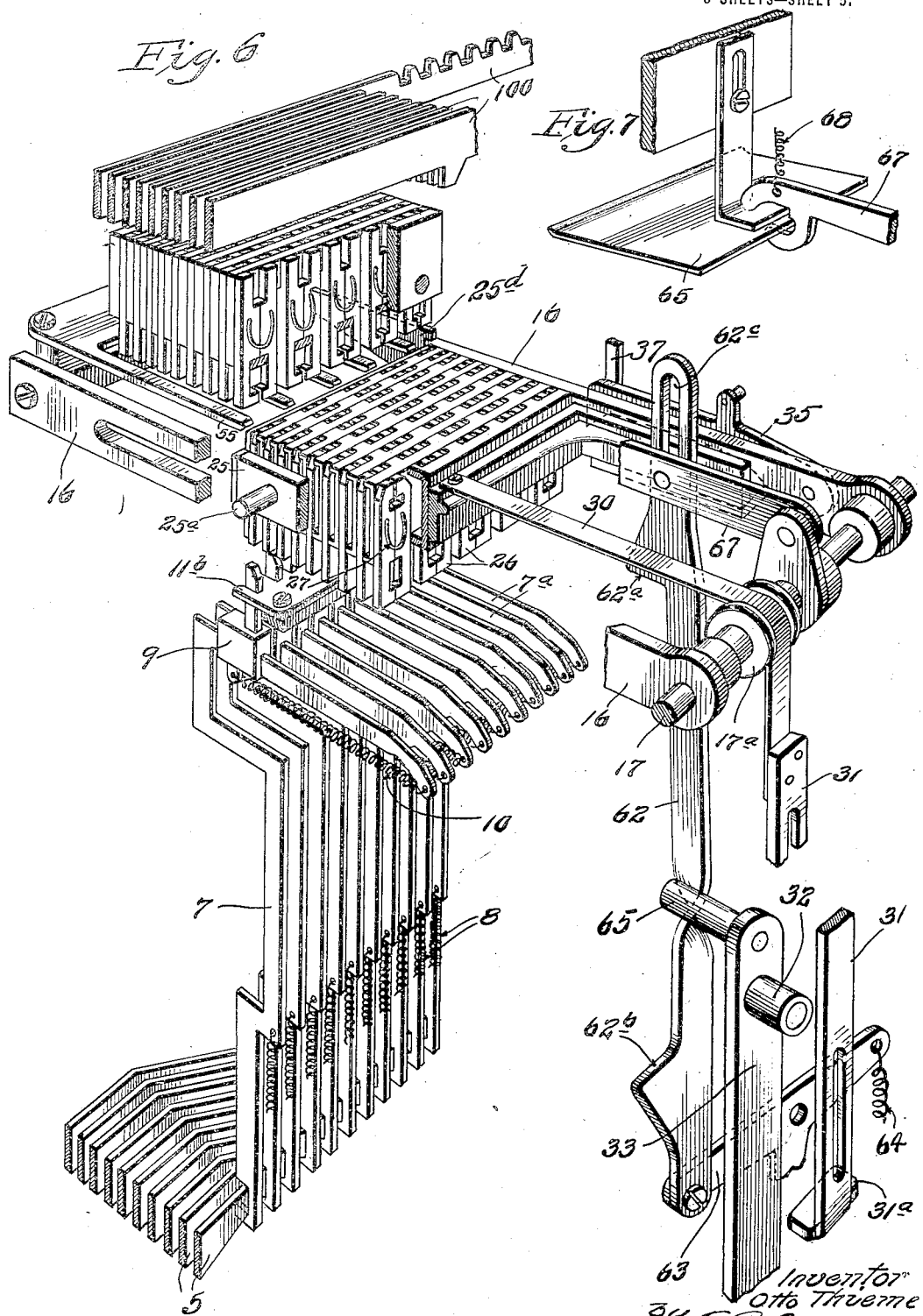

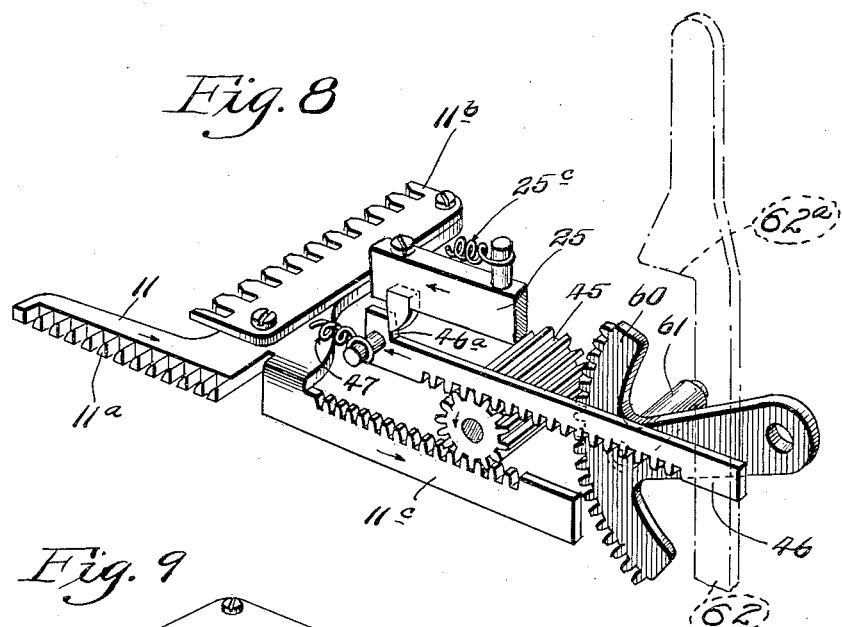
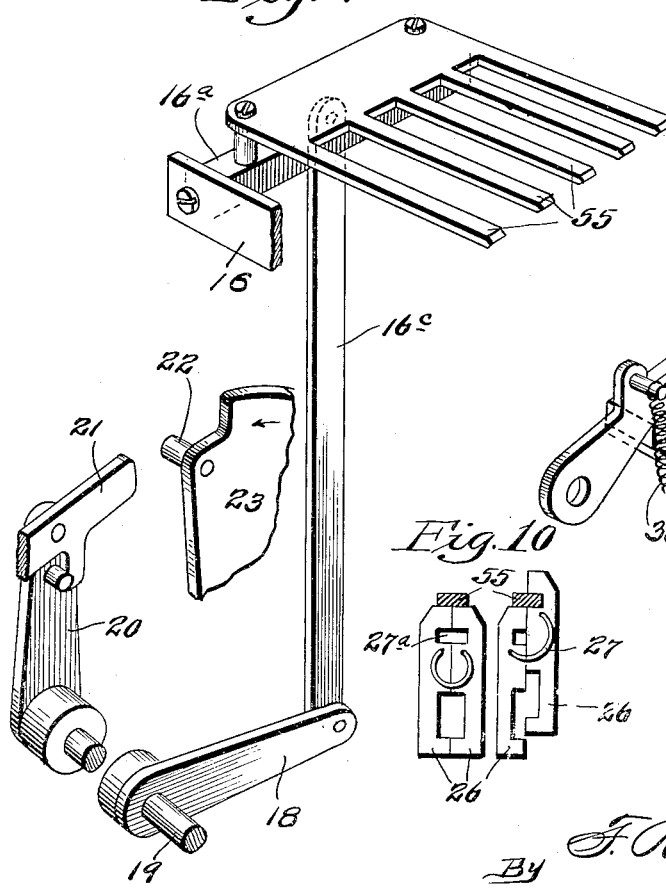
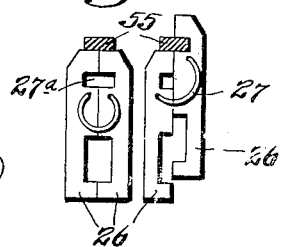
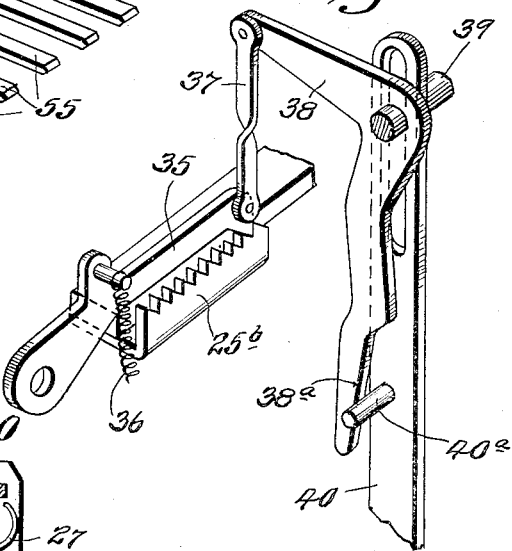

1,292,537.

Patented Jan. 28, 1919.
8 SHEETS—SHEET 7.

Inventor
Otto Thieme
by F. R. Cornwall
Atty.

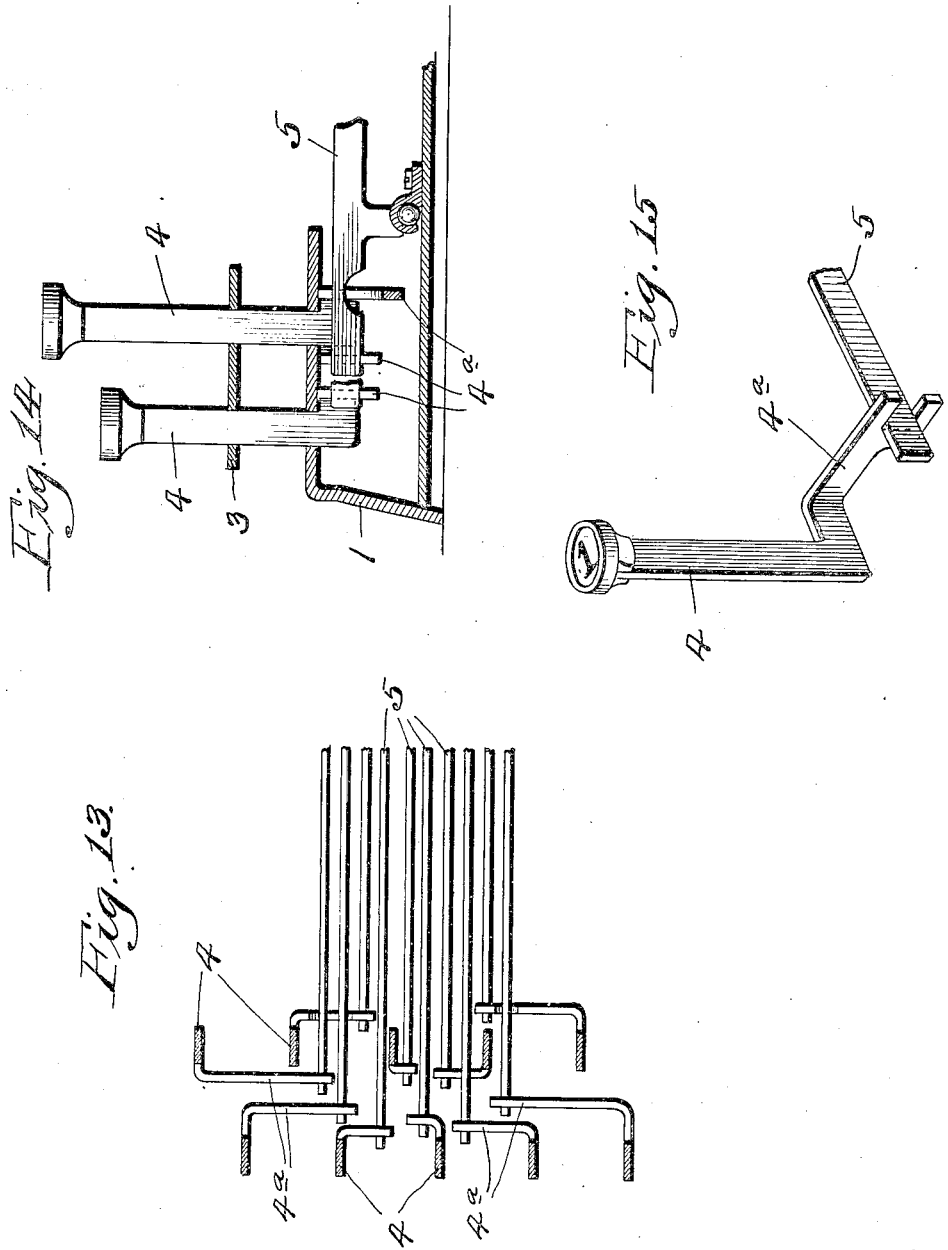

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,292,537.

Specification of Letters Patent.

Patented Jan. 28, 1919.

Application filed May 18, 1917. Serial No. 169,581.

*To all whom it may concern:*

Be it known that I, OTTO THIEME, a citizen of the United States, residing at the city of St. Louis, State of Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Figure 1 is a vertical sectional view through the upper rear portion of my improved calculating machine.

Fig. 2 is a vertical sectional view through the lower rear portion of my improved calculating machine.

Fig. 3 is a horizontal plan view showing the keyboard section of the adding mechanism.

Fig. 4 is a sectional view taken on the line 4—4 of Fig. 1.

Fig. 4a is a detail view showing the means for releasing the movable frame containing the stop pin positioning devices.

Fig. 5 is a detail view of the upper end of the escapement bar.

Fig. 6 is a detail view of the setting-up mechanism.

Fig. 7 is a detail view of the restoring mechanism for the stop pin positioning devices.

Fig. 8 is a detail view of the order determining mechanism.

Fig. 9 is a detail view of the lock for the stop pin positioning devices.

Fig. 10 is a detail view illustrating the operation of the lock shown in Fig. 9.

Fig. 11 is a detail view of the lock for the frame containing the stop pin positioning devices.

Fig. 13 is a plan view illustrating the forward ends of the key bars, the key shanks being shown in section.

Fig. 14 is a side elevational view of the keys illustrating their connections to the key bars.

Fig. 15 is a detail view showing the manner of connecting a key to the forward end of the key bar.

Figure 12:
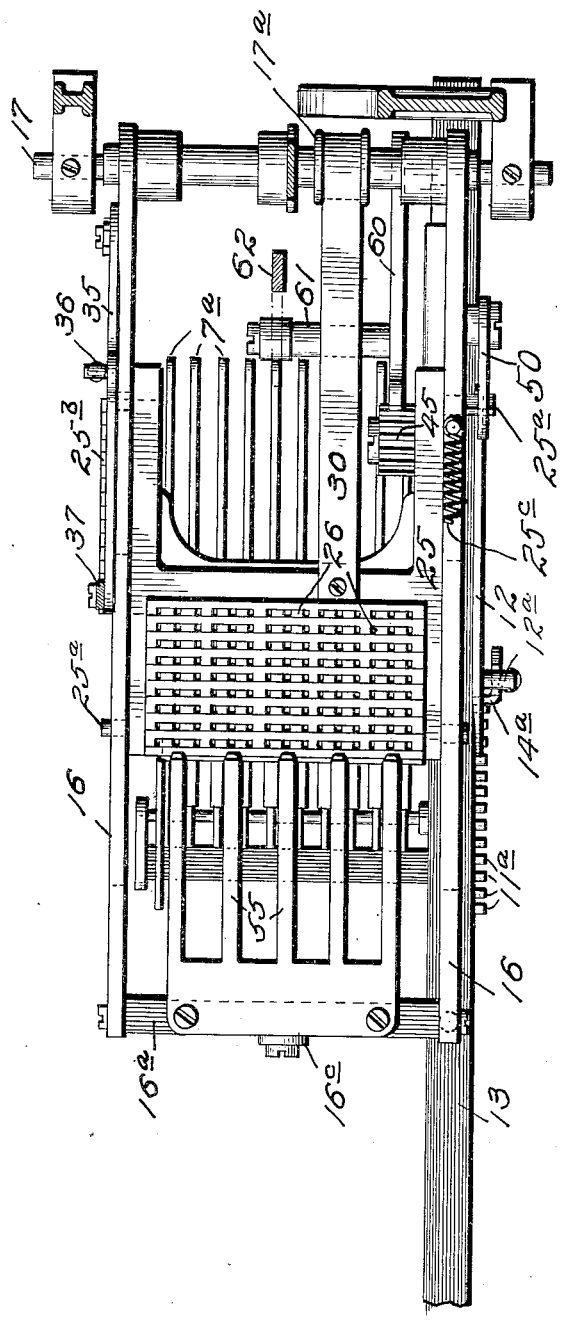
Fig. 12 is a plan view of the parts illustrated in Fig. 6.

This invention relates to a new and useful improvement in calculating machines of the character illustrated in United States Letters Patent No. 683,939 issued to William W. Hopkins October 8, 1901, and French Patent No. 383,719 granted January 16, 1908, to Hubert Hopkins and application for United States Letters Patent filed by Hubert Hopkins April 9, 1906, Serial No. 310,739.

One of the objects of my present invention is to utilize, in a sense, the principles of operation of the William W. Hopkins patent before referred to with respect to the order determining devices, with the exception that, instead of predetermining the order or highest denomination of the digit in the number, I determine the highest denomination by the successive operations of the digit keys. The actuating racks for the register wheels are controlled by a series of stop pins arranged in a stationary field of stops and to this extent resembles the well known type of Burroughs adding machine. These stop pins, however, in my present construction are raised by positioning pins mounted in a movable frame, which frame remains stationary during the time that its pins are being positioned, said frame being subsequently moved upon the operation of the machine to a position controlled by the order determining mechanism. When moved to its proper order, the movable frame is lifted to position the stop pins, is then depressed to its normal plane and restored to its normal position. Means are provided for locking the stop pin positioning devices when the movable frame, before referred to, is displaced from its normal position. The order determining mechanism is controlled by the keyboard and connected with the order determining mechanism is a series or row of pins mounted on the upper ends of the key bars or parts connected to and operated by the key bars.

In the drawings, 1 indicates the base of the machine, and 2 the side frame thereof. I have not shown the typewriting mechanism disclosed in the Hubert Hopkins patent and application before referred to, but in practice it is desirable to employ such a mechanism in connection with the form of adding machine shown. 3 is a guide plate for the digit key shanks mounted upon suitable posts above the base plate 1. 4 are the digit keys preferably pressed from sheet metal and which at their lower ends are provided with lateral projections for engaging the forward ends of the digit key bars 5. These digit key bars 5 are made of different lengths as shown in Fig. 13, whereby said key bars may coöperate with the lateral projections 4ª on the key shanks whereby the key bars are parallel to each other throughout their lengths. By thus making the key bars parallel and not converging at their rear ends, as shown in the Hubert Hopkins patent and application before referred to, it is unnecessary to exercise so much care in the manufacture of said key bars particularly in determining the proper angles by which each key bar shall be bent.

The key bars 5 are pivoted at 6 to the base frame and have their rear ends bent at an angle to engage the lower ends of the vertically disposed bars 7. These bars 7 are preferably notched at their lower ends to engage the rear ends of the key bars and may be said therefore to be connected to said key bars in that they are movable therewith. Springs 8 tend to draw the bars 7 to their lowermost positions at all times and by thus depressing the rear ends of bars 5, after a depression of the key, will raise the key to its normal position. The bars 7 are bent at their upper ends and formed with track extensions 7ª which track extensions form guiding supports for the pins 9 mounted to slide thereon. Pins 9 have a broadened base and are connected by springs 10 to the ends of the track extensions whereby said pins tend to move toward the right at all times. The means for restraining the rightward movement of pins 9 is an escapement bar 11, shown in Figs. 4 and 8, which escapement bar is provided with escapement teeth 11ª, a comb plate 11ᵇ between the teeth of which extend the pins 9, and a rack 11ᶜ.

12 indicates an escapement pawl mounted on a cross bar 13 secured to the side frame plates 2 of the machine, which escapement pawl is provided with a pin 12ª and teeth 12ᵇ. One tooth would be sufficient to coöperate with the teeth 11ª on the escapement bar, but I prefer to use a plurality of teeth so as to thereby distribute the wear and also increase the bearing surface of the teeth on the escapement pawl incident to the shock resulting from the travel of the movable frame as will hereinafter appear.

14 indicates a bar having a slot and pin connection with the cross bar 13, said bar 14 being held up against pin 12ª by means of a spring 15. The upper end of bar 14 is provided with a tooth 14ª designed to coöperate with the escapement teeth 11ª to restrain the movement of the escapement bar when the escapement pawl 12 and its teeth are lifted out of engagement therewith. When bar 14 is lowered after being raised, the teeth 12ᵇ will engage the teeth 11ª and the escapement bar 11 will travel one step to the right. The lower end of bar 14 is provided with a plate 14ᵇ lying over the rear ends of key bars 5, thus when any digit key is depressed to raise its bar 7 and its carried pin 9, the bar 14 will likewise be raised to lift the escapement pawl 12. The escapement bar 11, however, is not permitted to move, except to a very slight degree, upon the depression of a digit key, but when said digit key rises, the escapement bar will move rightwardly one step until arrested by the teeth of the escapement pawl 12. The upper right hand corners of the pins 9 are preferably beveled so that as the escapement bar moves rightwardly and permits rightward movement of the said pins 9 under the impelling action of their respective springs, said pins 9 will not be locked against movement by any of the stop pin positioning members now about to be described.

16 indicates a frame pivotally mounted at 17 to lugs or extensions on one of the side frame plates 2. The free ends of frame member 16 are connected by a cross bar 16ª to which is connected a link 16ᶜ to a rock arm 18 fixed on the shaft 19. This shaft 19 carries a rock arm 20 having a tappet 21 on its upper end as shown in Fig. 9, which tappet normally lies in the path of a pin 22 arranged on the cam 23. Cam 23 is rocked forwardly in the direction of the arrow upon the operation of the main shaft of the machine and consequently pin 22 will normally engage the tappet 21 and lift the frame 16 upon the initial operation of the main shaft. Means for raising the tappet 21 to disable the lifting mechanism above described forms no part of my present invention, nor does the construction and operation of the cam 23 form any part of this present invention. The side frame plate 16 are slotted at 16ᵇ, as shown in Fig. 4, through which slots extend pins 25ª on a frame 25. This frame 25 carries a series of stop pin positioning members 26 preferably arranged in couples which are connected together by springs 27 shown in Figs. 6 and 10. Each of these stop pin positioning members is provided with a notch 27ª near its upper end and which notch is designed to be exposed when any member 26 is raised by the elevation of a pin 9, the pin 27 holding such raised member 26 in its raised position until the raised member is locked, as will hereinafter appear.

Frame 26 is connected by a flat steel tape 30 to a vertically movable bar 31 mounted by a slot and pin connection to one of the side frame plates 2 (see Fig. 6). The lower end of bar 31 has a bent foot portion 31ª lying in the path of a projection 32 on the motor bar 33. This motor bar is connected to a crank of the motor driven shaft, not shown here, but which may be substantially of the type illustrated in the Hubert Hopkins Patent No. 1,025,698 dated May 7, 1912. When the motor bar 33, which is illustrated in Figs. 4 and 6 as standing in its raised position, is depressed, it will engage the foot portion 31$^a$ and through the bar 31 and tape 30 draw the frame 25 to the right or to its normal position. Tape 30 passes over a roller 17$^a$ arranged on the shaft 17. Means for locking the frame 25 in its normal position consists of a pawl 35, (see Figs. 6 and 11) which pawl is pivotally mounted on one of the frame bars 16 and is provided with a tooth at its free end for engaging with a ratchet tooth bar 25$^b$ carried by the frame 25. A spring 36 tends to hold the pawl 35 in engagement with the ratchet toothed member 25$^b$ causing said pawl to act as a centering or restraining pawl to prevent accidental displacement of the frame 25. Pawl 35 is connected by a link 37 to a bell crank lever 38 pivotally mounted on one of the cross shafts 39 of the machine, said bell crank lever having a cam face 38$^a$ at its lower edge which is designed to coöperate with the pin 40$^a$ mounted on a bar 40. This bar 40 is provided with a slot at its upper end through which passes a shaft 39 and thus the upper end of bar 40 is guided. The lower end of bar 40 is connected to a rock arm 41, shown in Fig. 4, on the main operating shaft 42, which is provided with a rock arm 43 to which the motor bar 33 is connected. The normal position of pin 40$^a$ is at the lower end of the cam face of bell crank 38 and consequently pawl 35 may be vibrated to permit the leftward movement of frame 25, when said frame 25 is brought to a position of rest by the order determining mechanism, and pawl 35 again engages the ratchet tooth bar 35$^b$ and locks the frame 25 in position. The pin 40$^a$ is so located with respect to the cam face 38$^a$ that pawl 35 is raised in proper time relation to the restoring mechanism for the frame, comprising in part the depressible bar 31, before described, so as to give freedom of movement to the restoring mechanism for the frame.

The order determining mechanism for frame 25 consists of the rack 11$^c$ carried by the escapement bar 11, (see Fig. 8) with which rack meshes a pinion 45, said pinion being mounted to rotate upon a stud secured to the cross bar 13.

46 indicates the order determining bar having teeth meshing with pinion 45 and being provided with a shoulder 46$^a$ at its inner end, there being a spring 47 connected to the inner end of said bar and tending at all times to pull the same leftwardly as shown in Figs. 4 and 8. Frame 25 has a spring 25$^c$ connected thereto which also tends to move said frame leftwardly. Frame 25, however, is restrained against leftward movement by the hooked end of a bar 50 whose upper end has a slot and pin connection with the frame 16. The hooked upper end of bar 50 engages one of the pins 25$^a$ of the frame 25, while the lower end of bar 50 is provided with a beveled extension 50$^a$ which is designed to coöperate with a pin 51$^a$ on the motor key bar 51 (see Fig. 4$^a$). The foot portion of bar 50 is provided with guiding pins 50$^b$ extending on each side of a post or bracket 52 whereby the lower end of bar 50 is guided in its vertical movement. As the motor key bar is drawn forwardly in the direction of the arrow, bar 50 will be raised so as to release the frame 25 and permit its bodily leftward movement. When the frame 25 moves leftwardly, prongs 55 on a comb plate secured to the free end of frame 16 and whose entering ends are slightly beveled, as shown in Fig. 6, will enter the notches 27$^a$ on such of the pins 26 as may have been raised, with the result that the raised pins will be locked in their elevated positions and the unoperated pins will also be locked in their lower or inoperative position. Frame 25 carries a plate 25$^d$ (see Fig. 4) which normally lies under the zero stop pins in the stationary field of stops so that should the motor key be depressed to effect an operation of the main shaft on the machine in which the frame 26 will ordinarily be raised, the plate 25$^d$ will lift the zero stop pins and prevent any forward movement of the racks. This is best seen in Fig. 1, wherein it will be noted that the zero stop pins are located immediately in advance of the shoulders 101 on the racks 100; and when any of the digit keys are depressed to set up a number in the movable frame and position the order determining mechanism, frame 25 after being released upon the initial operation of the motor key and when arrested under the stationary field of stop pins by the order determining mechanism, will, when lifted, cause its lifted and locked pins 26 to position the stop pins in the stationary field of stops, including such zeros as may appear in the number being set up in the stationary field of stop pins, and the plate 25$^d$ will also position the zero pins in the stationary field of stops so as to prevent movement of the racks of higher order not included in the number being introduced into the register wheels.

By referring to Fig. 9, it will be observed that this lifting of frame 16 to accomplish the above is only temporary, as the pin 22 passes under the tappet 21 immediately after the frame 25 has been lifted and consequently, the frame 25 is in readiness to be restored to its normal position.

The means for restoring frame 25 to its starting position, and this is accomplished at the beginning of what might be termed the first rocking movement of the main shaft, so that another number may be set up on the keyboard before the racks 100 are fully restored to their home position, consists of a segmental rack 60 meshing with the pinion 45, and pivotally mounted on a stud shaft supported by the cross bar 13. This segmental rack carries a pin or lateral projection 61. A bar 62 provided with a shoulder 62$^a$ near its upper end and a shoulder 62$^b$ at its lower end, is mounted upon a lever 63 pivotally mounted on a bracket extending up from the base of the machine and having a spring 64 connected to its rear end so as to lift the bar 62 and hold it in its normal position. The motor bar 33, before referred to, has a pin 65 which moves in a path including the shoulder 62$^b$ so that as the motor bar is descending, said pin will strike said shoulder and depress bar 62 so that the shoulder 62$^a$ will strike the pin 61 on the segmental rack, depressing said rack, restoring the order determining mechanism, including the frame 25, the escapement bar, and the pins 9. The step by step movement of the escapement bar leftwardly in positioning the order determining mechanism will, through its pinion 45, raise the segmental rack, and the depression of bar 62 in depressing the segmental rack, restore all of the parts controlled by the pinion to normal position. In order to insure the correct engagement of all of the parts, the segmental rack is depressed slightly beyond its normal position and the parts then permitted to move under the impelling action of their respective springs to normal position when the shoulder 62$^a$ is lifted from the pin 61.

As the frame 25 moves rightwardly, the stop pin positioning members therein which have been elevated and locked in their leftward position by the prongs 55 of the comb plate, before referred to, will be released by said prongs and become free to be restored.
65 indicates a restoring plate (see Figs. 4 and 7) which is provided with an upward extension having a slot and pin connection with a frame plate of the machine. This restoring plate is located over the stop pin positioning members in frame 25 and when the bar 62 is depressed, a slot 62$^c$ in its upper end, engaging a pin 66 on an arm 67, will depress the plate 65 and restore to their normal depressed position all of the stop pin positioning elements in frame 25. The free end of bar 67 is provided with hook-like members, as shown, to engage the upper and lower faces of the restoring plate 65. A spring 68 connected to the free end of bar 67 will normally maintain the same and restore plate 65 in its raised position. The restoring plate will be operated at the proper time with relation to other parts of the mechanism hereinabove described so as to timely place the stop pin positioning elements in the frame 25 in readiness for another operation of introducing a number into the machines.

One feature of advantage resulting from the employment of mechanism for setting-up numbers in machines of the type disclosed in said patents and application above referred to, resides in the fact that in the introduction of a number into the machine by successively depressing the digit keys, there is a relatively small mass of metal to be used and consequently, the machine not only has a lighter touch, but the correction of errors by the operation of the error key, not herein shown, is more easily accomplished. It is only necessary in the present form of setting-up mechanism to restore the escapement bar and its connected parts, whereas, in the old type of machine disclosed in said patents and application, the traveling carriage with the stop pin positioning elements therein had to be restored. The movement, therefore, of the parts initially operated being easy, on account of the lightness of the parts, the frame 25 will, when released, move under the impelling action of its spring 25$^c$ until arrested by the order determining mechanism, which latter, being connected or entrained with the escapement mechanism, will impose a slight shock or jar upon the teeth on the escapement bar and pawl which renders it desirable to increase the number of teeth on these parts which are in engagement with each other. The spring 25$^c$ is of such strength as to reduce this shock or jar to a minimum, having in mind, of course, the proper movement of frame 25 from its normal to its arrested position, which latter might extend to and include all of the rack bars. The tension of spring 25$^c$ must, therefore, be of such strength as to move the frame 25 with sufficient power and speed so as to locate the stop pin positioning elements carried by frame 25 under the stationary field of stop pins, with reasonable celerity.

I claim:

1. In a calculating machine, the combination of a totalizer and its actuating devices, means for controlling the excursions of said actuators, said means being normally out of controlling position relative to said actuators, order-determining mechanism which is operable while said controlling means is out of controlling position, digit keys for positioning said order-determining mechanism independently of any movement to controlling position on the part of said controlling mechanism, and means for moving said controlling mechanism into controlling position.

2. In a calculating machine, the combination with a totalizer and its actuating devices, of means for controlling the excursions of said actuating devices, said means including an order determining mechanism with escapement mechanism for controlling the movement thereof, digit keys for operating said escapement mechanism, and a movable frame containing members capable of being positioned upon the successive operations of said digit keys to represent a number, said movable frame being stationary at the time the number is being introduced therein.

3. In a calculating machine, the combination with a totalizer and its actuating devices, a setting up mechanism for controlling the excursions of movement of said actuating devices, said means including a frame containing movable members which are successively positioned to represent a number while said frame is stationary, digit keys, an order determining mechanism which is positioned by the operation of the digit keys in the operation of positioning said members in the stationary frame to represent a number, and means for moving said last-mentioned frame into controlling position relative to said actuating devices.

4. In a calculating machine, the combination with a totalizer and its actuating devices, a setting up mechanism for controlling the excursions of movement of said actuating devices, said means including a stationary field of stop pins and a movable frame containing members capable of being positioned to represent a number, means for positioning said members to represent a number while said frame is stationary and out of a controlling position with respect to the stop pins in the stationary field of stops, and means for moving said movable frame into position whereby the stops in said stationary field are in register and capable of being operated by the positioned members in said movable frame.

5. In a calculating machine, the combination with a totalizer and its actuating devices, a setting up mechanism for controlling the excursions of movement of said actuating devices, said means including a stationary field of stop pins, a movable frame containing members capable of being positioned to represent a number, digit keys for positioning said members when said movable frame is stationary and out of control of the stop pins in the stationary frame, and an order controlling mechanism which is positioned upon the successive operation of the digit keys for arresting said movable frame in its proper position under the stationary field of stop pins so as to place the movable members in control of said stop pins.

6. In a calculating machine, the combination with a totalizer and its actuating devices, a setting up mechanism for controlling the excursions of movement of said actuating devices, said means including a stationary field of stop pins designed to be raised in the path of movement of said actuating devices to control the excursions thereof, a movable frame which is held in a stationary position out of control of said stop pins, members in said movable frame capable of being positioned to represent a number, digit keys for positioning said members, means for holding said movable frame stationary while the members contained therein are being positioned to represent a number, means for releasing said movable frame so as to permit movement thereof to a position wherein its movable members are placed in control of said stop pins in the stationary frame, and means for lifting the movable frame so as to lift the pins in the stationary frame corresponding to the key-positioned members in the movable frame.

7. In a calculating machine, the combination with a totalizer and its actuating devices, a setting up mechanism for controlling the excursions of movement of said actuating devices, said means including a stationary field of stop pins, a movable frame containing key positioning members which are operated to represent a number, and means for holding said frame stationary while the number is being set up therein, and means for restoring said members to normal position after operation to represent a number, said means comprising a plate or member which when operated simultaneously engages all of said members and movable frame to restore them to normal position.

8. In a calculating machine, the combination with a totalizer and its actuating devices, a setting up mechanism for controlling the excursions of movement of said actuating devices, said means including a movable frame containing key positioned members, said frame being held stationary while said members are being positioned to represent a number, a stationary field of stop pins which is placed under control of said movable frame when the latter is shifted from its normal position, and means for locking the members in the movable frame in their key operated positions while said members are in control of the stop pins.

9. In a calculating machine, the combination with a totalizer and its actuating devices, a setting up mechanism for controlling the excursions of movement of said actuating devices, said means including a movable frame containing key positioned members, said frame being held stationary while said members are being positioned to represent a number, a stationary field of stop pins which is placed under control of said movable frame when the latter is shifted from its normal position, and means for locking the members in the movable frame in their key operated positions only while said members are in control of the stop pins.

10. In a calculating machine, the combination with a totalizer and its actuating devices, a setting up mechanism for controlling the excursions of movement of said actuating devices, said means including a movable frame containing key positioned members, said frame being held stationary while said members are being positioned to represent a number, a stationary field of stop pins which is placed under control of said movable frame when the latter is shifted from its normal position, and means for locking the members in the movable frame in their key operated positions only while said members are in control of the stop pins, said locking means comprising a comb plate whose prongs enter notches in the key positioned members to hold them in operative positions, said prongs passing over the remaining members to hold them in inoperative position.

11. In a calculating machine, the combination with a totalizer and its actuating devices, a setting up mechanism for controlling the excursions of movement of said actuating devices, said means including a stationary field of stop pins, a movable frame containing key positioned members, digit keys for positioning said members to represent a number while said frame is stationary and out of control of the stationary field of stops, means for holding said frame in its stationary position while a number is being set up therein, means for moving said frame to a controlling position with respect to the stationary field of stop pins, and means for holding said frame in its changed position while it is in control of the stationary field of stop pins.

12. In a calculating machine, the combination with a totalizer and its actuating devices, of a movable frame normally held stationary while it is in a position out of control of said actuators, members in said frame capable of being positioned to represent numbers, means for restraining said frame against movement, means for releasing said restraining means, and permitting said frame to move in controlling position relative to said actuators, a power shaft and connections operated by said power shaft for restoring said movable frame to normal position after movement of the same.

13. In a calculating machine, the combination with a totalizer and its actuating devices, of digit keys and their key bars, an order determining mechanism, an escapement mechanism operated by said digit keys for positioning said order determining mechanism according to the number of digits in the number being introduced, a frame containing members which are positioned by said keys to represent a number, said frame remaining stationary during the time that the number is being set up therein, and a restoring mechanism for said frame, said restoring mechanism being entrained with the order determining mechanism.

14. In a calculating machine, the combination with a totalizer and its actuating devices, means for controlling the excursions of movement of said actuating devices, said means including digit keys and their key bars, each of said key bars carrying at its rear end an extension provided with a track member and pins slidingly mounted on said track member, said pins being lifted with the key bars and movable longitudinally said track members.

15. In a calculating machine, the combination with a totalizer and its actuating devices, means for controlling the excursions of movement of said actuating devices, said means including digit keys and their key bars, the latter being provided with track members, pins slidingly mounted on said track members, a spring connected to each pin for moving the same in one direction along said track members, a bar for restraining the movement of said pins along said track member, an escapement mechanism operated by said key bars and which escapement mechanism is in control of said retraining bar, and mean for restoring said restraining bar and said pins to their normal or starting position.

16. In a calculating machine, the combination of totalizers and their actuating devices, means for controlling the excursions of movement of said actuating devices, said mean including digit keys and their key bars, said key bars being of different lengths and arranged parallel to each other, and said keys having flat shanks with lateral extensions integral therewith, said extensions being formed at their extremities for connection to the forward ends of said key bars.

In testimony whereof I hereunto affix my signature this 10th day of May, 1917.

OTTO THIEME.